(12) United States Patent
Katou

(10) Patent No.: US 6,954,688 B2
(45) Date of Patent: Oct. 11, 2005

(54) TIRE STATUS MONITORING APPARATUS

(75) Inventor: Michiya Katou, Ichinomiya (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/686,105

(22) Filed: Oct. 15, 2003

(65) Prior Publication Data

US 2004/0193340 A1 Sep. 30, 2004

(30) Foreign Application Priority Data

Mar. 28, 2003 (JP) ........................................ 2003-092424

(51) Int. Cl.[7] .......................... B60C 23/00; G06F 19/00
(52) U.S. Cl. .......................... 701/29; 340/442; 340/445; 73/146.5
(58) Field of Search ................... 701/29; 340/442–448; 73/146, 146.2, 146.3, 146.4, 146.5

(56) References Cited

U.S. PATENT DOCUMENTS

| | | | |
|---|---|---|---|
| 6,604,416 B2 * | 8/2003 | Tsujita | 73/146.5 |
| 6,707,390 B2 * | 3/2004 | Hirohama et al. | 340/870.11 |
| 2002/0084896 A1 | 7/2002 | Dixit et al. | |
| 2002/0149477 A1 * | 10/2002 | Desai et al. | 340/442 |
| 2003/0156022 A1 * | 8/2003 | Saheki et al. | 340/442 |
| 2003/0179085 A1 * | 9/2003 | Ghabra et al. | 340/445 |
| 2003/0179086 A1 * | 9/2003 | Nantz et al. | 340/445 |

FOREIGN PATENT DOCUMENTS

| | | |
|---|---|---|
| EP | 1 092 568 A2 | 4/2001 |
| EP | 1 197 356 A2 | 4/2002 |
| JP | 5-169931 A | 7/1993 |

* cited by examiner

*Primary Examiner*—Gary Chin
(74) *Attorney, Agent, or Firm*—Crompton, Seager & Tufte, LLC

(57) ABSTRACT

A tire status monitoring apparatus capable of providing notification of an abnormal status for a tire in accordance with the speed of a vehicle. The tire status monitoring apparatus includes transponders which are provided on the respective tires, detect statuses of the tires in response to a request signal and generate transponder data including data indicative of the statuses of the tires detected, and a transceiver which transmits the request signal to each transponder and receives the transponder data from each transponder. The transceiver determines the number of times the request signal is transmitted per unit time in accordance with the speed of the vehicle.

14 Claims, 2 Drawing Sheets

TIRE STATUS MONITORING APPARATUS

BACKGROUND OF THE INVENTION

The present invention relates to a wireless type tire status monitoring apparatus capable of checking the status of a tire, such as tire air pressure while the driver remains in the vehicle. More particularly, this invention relates to a tire status monitoring apparatus which has a transponder which transmits data indicating the status of a tire in response to a request signal and a transceiver which transmits the request signal and receives data sent by the transponder.

There are tires each incorporating a transponder having a coil antenna for radio transmission of the status of the tires of a vehicle. In the case where a request signal is transmitted from outside, the transponder transmits the identification of the associated tire and other data via the coil antenna based on power induced in the coil antenna (see Japanese Patent Laid-Open Publication No. Hei 5-169931).

In the technique disclosed in the above Japanese patent document, however, the time interval for externally transmitting the request signal is constant regardless of the speed of the vehicle. Accordingly, the transponder that responds to the request signal always transmits data for the associated tire at a constant time interval. Even in a case where the driver should be promptly informed of an abnormal state of a tire, such as in fast driving mode. Therefore, the driver would not be quickly informed of an abnormal state.

SUMMARY OF THE INVENTION

One aspect of the present invention is a tire status monitoring apparatus for monitoring statuses of a plurality of tires provided on a vehicle. The tire status monitoring apparatus includes transponders provided on the respective tires which detect statuses of the tires in response to a request signal and generate transponder data including data indicative of the statuses of the tires detected. A transceiver transmits the request signal to each transponder, receives the transponder data from each transponder, and determines the number of times the request signal is transmitted per unit time in accordance with speed of the vehicle.

Another aspect of the present invention is a method of monitoring statuses of a plurality of tires provided on a vehicle. Each tire includes a transponder which generates transponder data including data indicative of the statuses of the tire and the vehicle includes a transceiver which receives the transponder data from each transponder. The method includes detecting the speed of the vehicle, determining the number of times a request signal is transmitted per unit time to the plurality of tires in accordance with the detected speed of the vehicle, transmitting the request signal to each transponder from the transceiver by the decided number of transmissions of the request signal per unit time, causing the transponders to detect the statuses of the tires in response to the request signal and generate the transponder data, and transmitting the transponder data to the transceiver.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
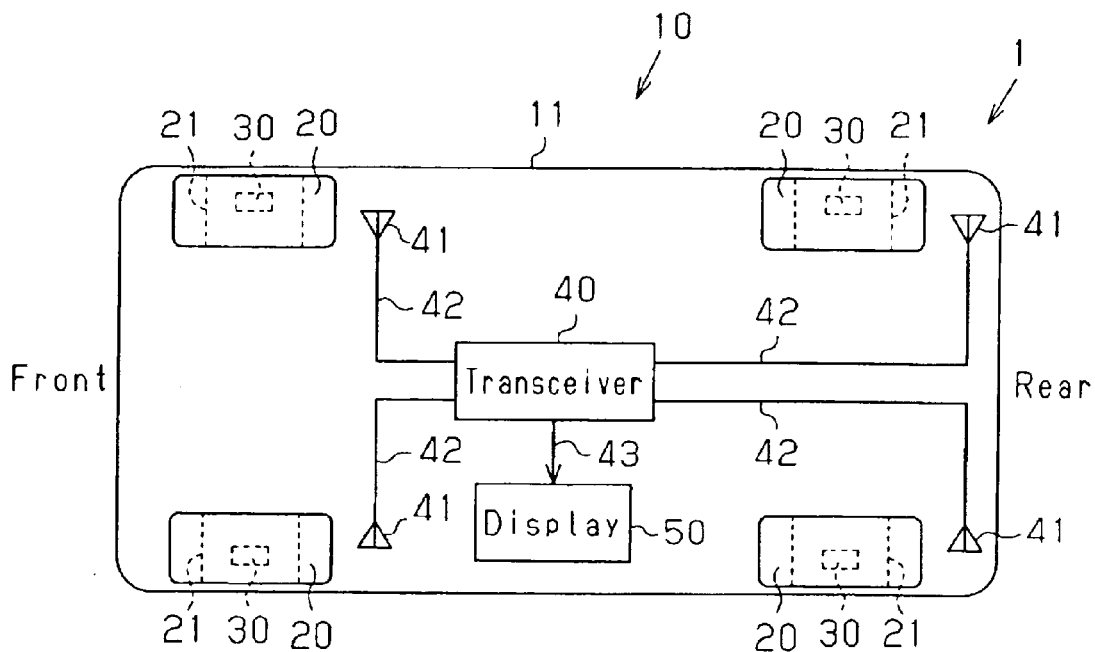
FIG. 1 is a schematic structural diagram of a tire status monitoring apparatus according to one embodiment of the present invention.

In the drawings, like numerals are used for like elements throughout.

FIG. 1 shows a vehicle 10 including a tire status monitoring apparatus 1 according to one embodiment of the present invention. As shown in FIG. 1, the tire status monitoring apparatus 1 includes four transponders 30 provided on respective tires 20 of the vehicle 10 and a single transceiver 40 provided on a body 11 of the vehicle 10.

Each transponder 30 is fixed inside the associated tire 20, e.g., inside a wheel 21 of the tire 20. Each transponder 30 measures the status of the associated tire 20, i.e., air pressure in the associated tire 20, and generates transponder data including air pressure data acquired by the measurement. The transponder data is wirelessly transmitted to the transceiver 40 from each transponder 30.

The transceiver 40 is provided at a predetermined location of the body 11 and operates on power from, for example, the battery (not shown) of the vehicle 10. The transceiver 40 has four antennae 41 respectively corresponding to the four transponders 30. Each antenna 41 is connected to the transceiver 40 via a cable 42. The transceiver 40 generates a request signal at a predetermined time interval and transmits the request signal from each antenna 41. Each transponder 30 generates induced power based on the request signal and transmits transponder data using the induced power. The transceiver 40 receives the transponder data transmitted from each transponder 30 mainly via the associated antenna 41.

A display 50 is placed in a visible range of the driver of the vehicle 10, such as the passenger compartment. The display 50 is connected to the transceiver 40 via a cable 43.

Figure 2:
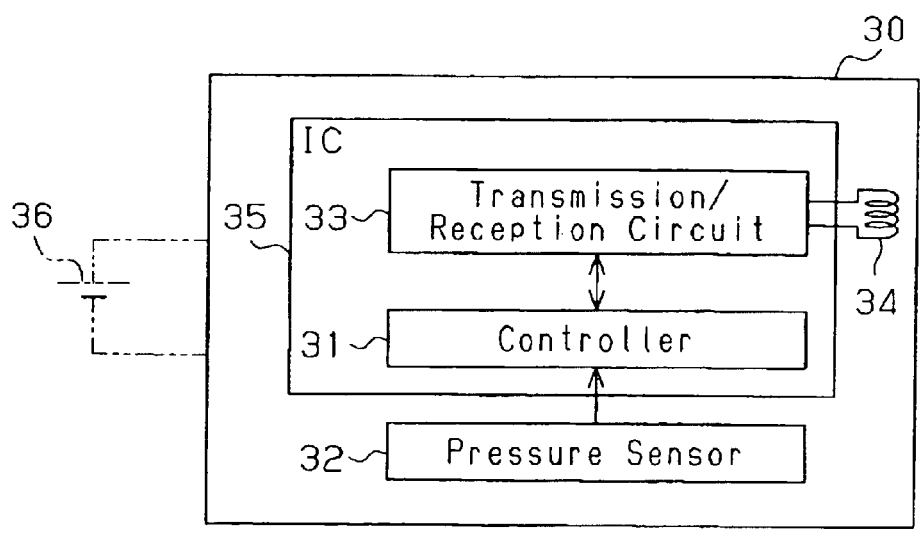
FIG. 2 is a schematic block diagram of a transponder of the tire status monitoring apparatus in FIG. 1.

As shown in FIG. 2, each transponder 30 includes a controller 31, a pressure sensor 32, a transmission/reception circuit 33 and a coil antenna 34. The controller 31 is, for example, a microcomputer including a CPU (Central Processing Unit), ROM (Read Only Memory) and RAM (Random Access Memory). Inherent ID codes are registered beforehand in the ROM. The ID codes are used to identify the four transponders 30 provided on the vehicle 10.

The pressure sensor 32 measures the air pressure in the tire 20 and supplies the controller 31 with air pressure data acquired by the measurement. The controller 31 generates transponder data including the air pressure data and the ID code registered in the internal memory, and supplies the transmission/reception circuit 33 with the transponder data.

The transmission/reception circuit 33 encodes and modulates the transponder data, then transmits the encoded and modulated transponder data via the coil antenna 34. The coil antenna 34 generates induced power based on, for example, the request signal sent from the associated antenna 41.

The transmission/reception circuit 33 supplies the induced power to the controller 31. The controller 31 controls the transponder 30 with the supplied induced power. That is, the transponder 30 operates on the power induced in the coil antenna 34. The controller 31 and the transmission/reception circuit 33 are formed on a single chip semiconductor substrate and integrated into an IC 35.

Figure 3:
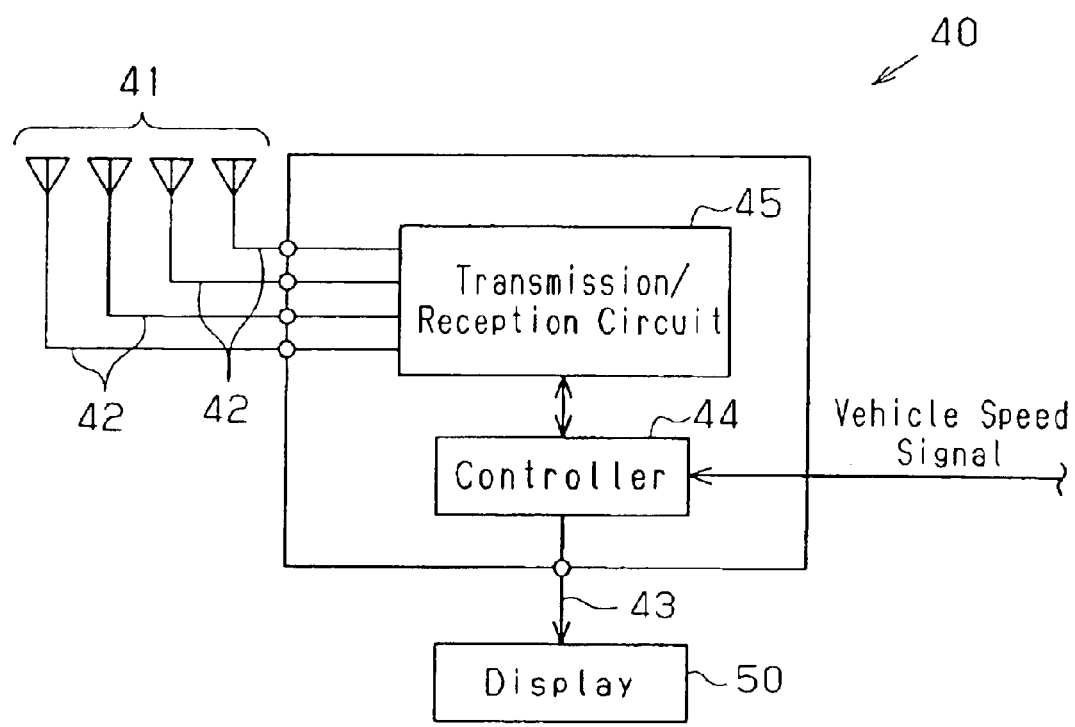
FIG. 3 is a schematic block diagram of a transceiver of the tire status monitoring apparatus in FIG. 1.

As shown in FIG. 3, the transceiver 40 incorporates a controller 44 which processes transponder data received via the antenna 41 and a transmission/reception circuit 45. The controller 44 is, for example, a microcomputer including a CPU, ROM and RAM.

The transmission/reception circuit 45 receives the transponder data from each transponder 30 mainly via the associated antenna 41. The transmission/reception circuit 45 demodulates and decodes the encoded and modulated transponder data, and then supplies the resultant transponder data to the controller 44.

Based on the received transponder data, the controller 44 determines the air pressure of the tire 20 associated with the sender transponder 30. The controller 44 displays data about the air pressure on the display 50. In the case where the air pressure of the tire 20 is abnormal, particularly, warning of the event is displayed on the display 50. Further, the controller 44 receives a signal indicative of the speed of the vehicle 10 (vehicle speed signal) from a predetermined device provided on the vehicle 10, for example, a speedometer (not shown). Therefore, the controller 44 determines the speed of the vehicle 10.

The controller 44 transmits a request signal to the transmission/reception circuit 45 from the antenna 41 at a predetermined time interval. Here, the predetermined time interval is set based on the speed of the vehicle 10 or the vehicle speed signal supplied to the controller 44. In the case where the speed of the vehicle 10 is less than 100 km/h, for example, a request signal is transmitted once per minute. In the case where the speed of the vehicle 10 is equal to or greater than 100 km/h and less than 200 km/h, a request signal is transmitted twice per minute (e.g., once every 30 seconds). In the case where the speed of the vehicle 10 is equal to or greater than 200 km/h and less than 300 km/h, a request signal is transmitted four times per minute (e.g., once every 15 seconds). In other words, the controller 44 changes the number of times the request signal is transmitted per unit time in accordance with the speed of the vehicle 10.

Based on the request signal, induced power is generated on the coil antenna 34 of the transponder 30. The pressure sensor 32 measures air pressure in the tire 20 using that power. The transponder 30 transmits transponder data including air pressure data via the coil antenna 34. The transceiver 40 receives the transponder data transmitted from each transponder 30 mainly via the associated antenna 41.

The operation of the tire status monitoring apparatus 1 will be discussed next. First, the controller 44 of the transceiver 40 sets the number of times the request signal is transmitted per unit time (e.g., per minute) in accordance with the supplied vehicle speed. As a result, the time interval for transmission of the request signal is determined.

The controller 44 of the transceiver 40 transmits the request signal from the antenna 41 by means of the transmission/reception circuit 45 in accordance with the determined time interval. Then, induced power is generated in the coil antenna 34 of the transponder 30 associated with the antenna 41. Based on the induced power, the transponder 30 measures air pressure in the tire 20 by means of the pressure sensor 32. The transponder 30 transmits transponder data including the measured air pressure data via the coil antenna 34.

The transceiver 40 receives the transponder data transmitted from the transponder 30 via the associated antenna 41. As a result, the transceiver 40 grasps the air pressure of the tire 20 corresponding to the sender transponder 30 based on the received transponder data. The transceiver 40 displays data about the air pressure on the display 50. In the case where the air pressure of the tire 20 is abnormal, particularly, warning of the event is displayed on the display 50.

The tire status monitoring apparatus 1 according to this embodiment has the following advantages.

(1) The controller 44 of the transceiver 40 determines the number of times the request signal is transmitted per unit time (e.g., per minute) in accordance with the supplied vehicle speed. As a result, the time interval for transmission of the request signal is determined. That is, during faster speed driving, the number of transmissions of the request signal per unit time is increased, as compared with the case where the vehicle 10 is stopped or the case where the vehicle 10 is being driven at a low speed. As the speed of the vehicle 10 becomes faster, the number of transmissions of the request signal per unit time is increased. In the case where an abnormal status of the tire 20 occurs while the vehicle 10 is being driven fast, therefore, warning of the event is displayed on the display 50, thus ensuring swift notification of the abnormal status of the tire 20 to the driver. It is therefore possible to provide notification of the abnormal status of the tire 20 according to the speed of the vehicle 10.

(2) The controller 44 changes the number of times the request signal is transmitted per unit time in accordance with the speed of the vehicle 10. Accordingly, the transmission/reception circuit 45 transmits the request signal by the number of times per unit time which is optimal for the speed of the vehicle 10. When the vehicle 10 is stopped or is being driven slowly, therefore, an unnecessary request signals are not transmitted.

(3) The transceiver 40 transmits the request signal once per minute in the case where the speed of the vehicle 10 is less than 100 km/h, twice per minute (e.g., once every 30 seconds) in the case where the speed of the vehicle 10 is equal to or greater than 100 km/h and less than 200 km/h, and four times per minute (e.g., once every 15 seconds) in the case where the speed of the vehicle 10 is equal to or greater than 200 km/h and less than 300 km/h. That is, the possible speed of the vehicle 10 is separated into a plurality of speed regions and the controller 44 increases the number of transmissions of the request signal per unit time when the speed of the vehicle 10 has reached a speed region greater than a predetermined speed region. In the case where an abnormal status of the tire 20 occurs when the vehicle 10 is being driven fast, therefore, warning of the event is displayed on the display 50. It is therefore possible to provide notification of the abnormal status of the tire 20 according to the speed of the vehicle 10.

It should be apparent to those skilled in the art that the present invention may be embodied in many other specific forms without departing from the spirit or scope of the invention. Particularly, it should be understood that the invention may be embodied in the following forms.

The number of times the request signal is transmitted may be calculated based on a predetermined equation in accordance with the speed of the vehicle 10 (e.g., an integer acquired from the speed of the vehicle 10× 2/100). The constant in the equation is arbitrary.

The number of times the request signal is transmitted may be changed further in accordance with the environment, the driving area or the like under which the vehicle 10 is used. It is preferable that the constant in the equation should be arbitrary.

The time intervals per unit time at which the request signal is generated may not be equal to one another.

As indicated by the two-dot chain line in FIG. 2, the transponder 30 may have a battery 36 which supplies power. In the case where induced power generated in the coil antenna 34 based on the request signal from the transceiver 40 is less than the power needed to operate the transponder 30, the controller 31 supplies power from the battery 36. When air pressure in the tire 20 drastically changes, the controller 31 supplies power from the battery 36. In this case, the transponder 30 can transmit data indicative of the status of the tire 20 even when the induced power is insufficient or when the air pressure in the tire 20 drastically changes.

Further, the controller 31 may supply power from the battery 36 even when the transmission power from the transponder 30 needs to be increased.

In addition to the pressure sensor 32, a temperature sensor which measures the temperature in the tire 20 may be provided in the transponder 30 so that internal temperature data of the tire 20 can be transmitted.

The air pressure data to be transmitted from the transponder 30 may be data specifically indicating the value of the air pressure, or data simply indicating whether the air pressure lies within an allowable range or not, i.e., it may be data indicating whether the tire 20 corresponds to an abnormal status.

The transponder data may not include an ID code.

The vehicle is not limited to a four-wheel vehicle, but may be a two-wheel bicycle or motorcycle, a multi-wheel bus or tractor, or an industrial vehicle or the like (e.g., a forklift) provided with tires 20. In the case where the transponders 30 are provided on the tires of a tractor, the transceiver 40 and the display 50 are placed on the tractor.

Therefore, the present examples and embodiments are to be considered as illustrative and not restrictive and the invention is not to be limited to the details given herein, but may be modified within the scope and equivalence of the appended claims.

What is claimed is:

1. A tire status monitoring apparatus for monitoring statuses of a plurality of tires provided on a vehicle, the tire status monitoring apparatus comprising:
   transponders provided on the respective tires which detect statuses of the tires in response to a request signal and generate transponder data including data indicative of the statuses of the tires detected; and
   a transceiver which transmits the request signal to each transponder, receives the transponder data from each transponder, and determines the number of times the request signal is transmitted per unit time in accordance with a speed range of the vehicle;
   wherein the transceiver has a plurality of speed ranges including a first speed range and a second speed range in which a speed of the vehicle is faster than that in the first speed range, wherein the number of times the request signal is transmitted per unit time is constant within each speed range, and wherein the transceiver increases the number of times the request signal is broadcast per unit time when the speed of the vehicle increases from the first speed range to the second speed range.

2. The tire status monitoring apparatus according to claim 1, wherein the transceiver determines a time interval at which the request signal is transmitted in accordance with the speed range of the vehicle.

3. The tire status monitoring apparatus according to claim 1, wherein the transceiver changes the number of times the request signal is transmitted per unit time as the speed range of the vehicle changes.

4. The tire status monitoring apparatus according to claim 1, wherein the transceiver increases the number of times the request signal is transmitted per unit time as the speed of the vehicle becomes faster.

5. The tire status monitoring apparatus according to claim 1, wherein the data indicative of the status of the tire includes data about air pressure of the tire.

6. The tire status monitoring apparatus according to claim 5, wherein the data indicative of the status of the tire includes data about temperature inside the tire.

7. The tire status monitoring apparatus according to claim 5, wherein the transponder data includes an ID code for identifying each tire.

8. The tire status monitoring apparatus according to claim 1, wherein the transceiver changes the number of times the request signal is transmitted per unit time in a stepwise fashion when the speed range of the vehicle changes.

9. The tire status monitoring apparatus according to claim 1, wherein the first speed range is a relatively low speed range and the second speed range is a relatively high speed range.

10. A method of monitoring statuses of a plurality of tires provided on a vehicle each tire includes a transponder which generates transponder data including data indicative of the statuses of the tire and the vehicle includes a transceiver which receives the transponder data from each transponder, the method comprising the steps of:
    detecting the speed of the vehicle, including determining one of a plurality of speed ranges including a first speed range and a second speed range in which a speed of the vehicle is faster than that in the first speed range;
    determining the number of times a request signal is transmitted per unit time to the plurality of tires in accordance with the detected speed range of the vehicle; wherein the number of times the request signal is transmitted per unit time is constant within each speed range, and wherein the number of times the request signal is transmitted per unit time is increased when the speed range of the vehicle changes from the first speed range to the second speed range;
    transmitting the request signal to each transponder from the transceiver by the decided number of transmissions of the request signal per unit time;
    causing the transponders to detect the statuses of the tires in response to the request signal and generate the transponder data; and
    transmitting the transponder data to the transceiver.

11. The method according to claim 10, wherein the step of determining the number of transmissions includes increasing the number of times the request signal is transmitted per unit time as the speed range of the vehicle becomes faster.

12. The method according to claim 10, wherein the data indicative of the status of the tire includes data about air pressure of the tire.

13. The method according to claim 10, wherein determining the number of times a request signal is transmitted per unit time includes changing the number of times the request signal is transmitted per unit time in a stepwise fashion when the speed range of the vehicle changes.

14. The method according to claim 10, wherein the first speed range is a relatively low speed range and the second speed range is a relatively high speed range.

* * * * *

UNITED STATES PATENT AND TRADEMARK OFFICE
CERTIFICATE OF CORRECTION

PATENT NO. : 6,954,688 B2
DATED : October 11, 2004
INVENTOR(S) : Michiya Katou

It is certified that error appears in the above-identified patent and that said Letters Patent is hereby corrected as shown below:

<u>Column 6,</u>
Line 26, after "vehicle" and before "each", insert -- wherein --.

Signed and Sealed this

Thirteenth Day of December, 2005

JON W. DUDAS
*Director of the United States Patent and Trademark Office*